THOMAS L. PIERCE & GEORGE PIERCE.
Improvement in Seeders.
No. 121,809.                                   Patented Dec. 12, 1871.
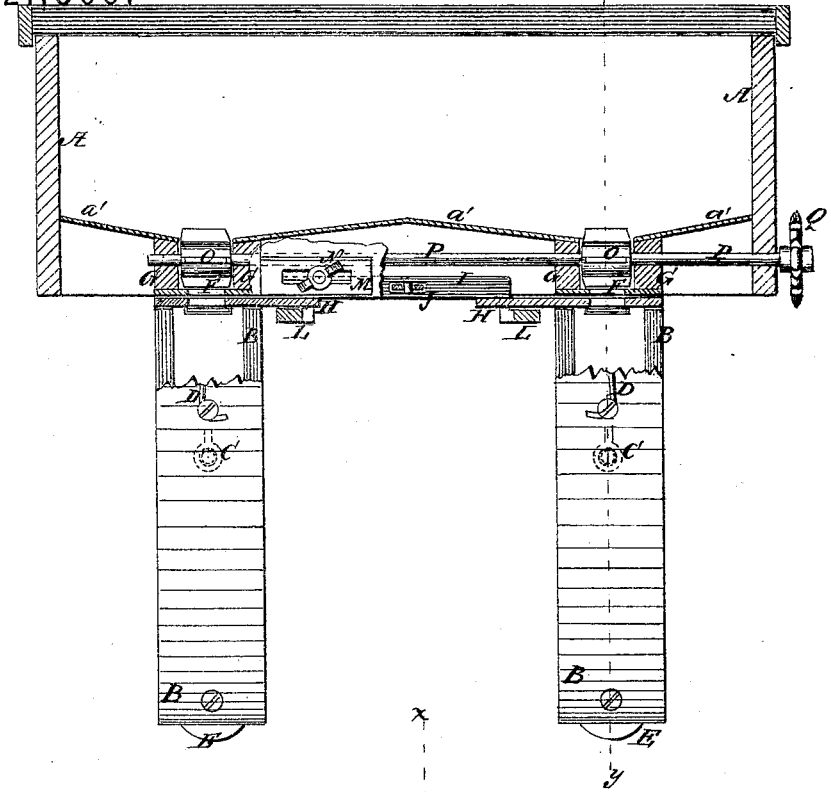
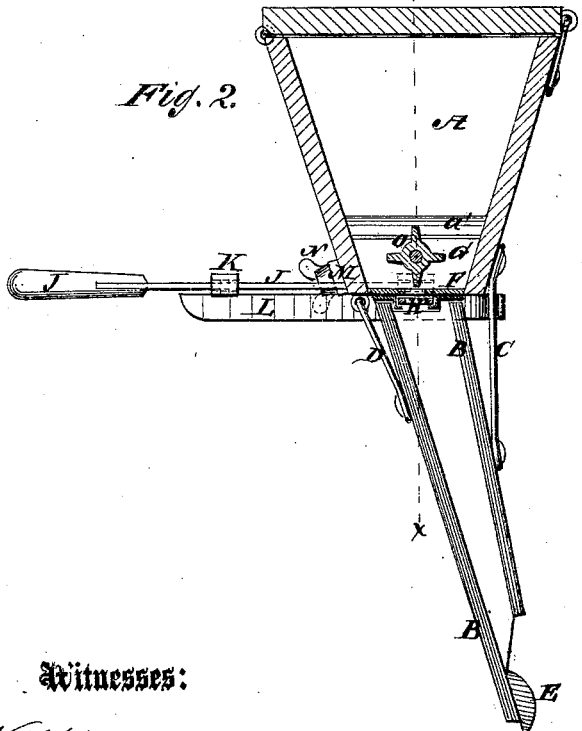
Fig. 2.
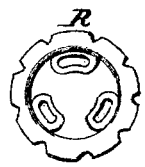
Fig. 3.
Witnesses:
E. Wolff
Francis McArdle
Inventor:
Thomas L. Pierce
George Pierce.
PER
Attorneys.

UNITED STATES PATENT OFFICE.

THOMAS L. PEIRCE AND GEORGE PEIRCE, OF NEW PROVIDENCE, (UNION POST OFFICE,) IOWA.

IMPROVEMENT IN SEEDERS.

Specification forming part of Letters Patent No. 121,809, dated December 12, 1871.

*To all whom it may concern:*

Be it known that we, THOMAS L. PEIRCE and GEORGE PEIRCE, of New Providence, (Union Post Office,) in the county of Hardin and State of Iowa, cylinder E, and piston F, arranged and combined have invented a new and useful Improvement in Seeders; and we do hereby declare that the following is a full, clear, and exact description thereof, which will enable others skilled in the art to make and use the same, reference being had to the accompanying drawing forming part of this specification.

Figure 1 is a vertical longitudinal section of our improved seeder taken through the line $x\ x$, Fig. 2. Fig. 2 is a vertical cross-section of the same taken through line $y\ y$, Fig. 1. Fig. 3 is a detail view of the spur-wheel to be attached to the sulky-wheel.

Our invention relates to seeders; and consists of the improvement hereinafter fully described and subsequently pointed out in the claim.

A is the seed-box, in the bottom $a'$ of which are formed discharge-openings, said bottom being so formed as to incline toward said openings from the ends and center of the box, as shown in Fig. 1. B are the spouts by which the seed is conducted to the ground from the said discharge-openings, and which are secured to the edges of the front and rear sides of the box A by the rods C D. The rod C is pivoted at its lower end to the forward side of the spout B, and has an eye formed in its upper end to hook over a screw-head or other catch attached to the lower part of the forward side of the box A. The rod D is pivoted at its upper end to the lower edge of the rear side of the box A, and upon its lower end is formed a hook to hook over a screw-head or other catch attached to the rear side of the spout B. This construction allows the spouts B to be readily detached for convenience in passing from place to place. The forward part of the lower ends of the spouts B are cut away, and to the forward side of the downwardly-projecting rear parts of said ends are attached half-oval buttons E, to scatter the seed as it falls through said spouts to the ground. By turning the buttons side or end upward the seed may be scattered more or less, as may be desired. F is a perforated plate placed at the upper end of the spouts B and secured to the edges of the blocks G, which are placed at each side of the discharge-openings in the bottom $a'$ of the seed-box A, and thus form chambers or pits into which the grain collects and from which it passes through the perforations of the plates F. H are the slides or dropping-plates, which work in grooves upon the lower sides of the perforated plates F, and which have slots formed in them to receive the grain from the seed-box A and convey it to the conductor-spouts D. The inner ends of the dropping-slides H are pivoted to the ends of a bar, I, to the center of which is pivoted the forward end of the lever J, which is pivoted to a cross-bar, K, attached to the plow-handles or bars L, to which the seed-box A is attached. The rear end of the lever J extends back into such a position that it may be conveniently reached and operated by the plowman. The amount of seed received and conveyed to the spouts B by the dropping-slides H is regulated by adjusting the said slides so that more or less of the slot formed in said slides may pass beneath the slots or holes in the plate F. M is a slotted bar or plate, through the slot of which passes a bolt attached to the rear side of the box A, and to which the said bar is secured by a hand-nut, N, so that, by loosening the said nut, the bar or plate M may be adjusted to limit the throw of the lever J and consequently the throw of the dropping-slides. The continuous passage of the seeds through the plate F is insured by the small flanged cylinders O placed longitudinally with the box A in the discharge-pits or chambers of said box A. The flanged cylinders O are attached to a small shaft, P, which passes through and revolves in the blocks G and the end of the seed-box A. To the outer end of the rod P is attached a grooved or spur-wheel, Q, around which passes a chain which also passes around a grooved or spur-wheel, R, which is designed to be attached to the wheel of the sulky so that the flanged cylinders O may be revolved by the advance of the machine. The flanged cylinders O also act as a cut-off to prevent any more than the desired amount of grain from being carried out at a time.

Having thus described our invention, we claim as new and desire to secure by Letters Patent—

In seeders, the oval-shaped buttons E pivoted on cut-away ends of the conducting-spouts B, as described, to admit of scattering the seed to a greater or less extent, as set forth.

THOMAS L. PEIRCE.
GEORGE PEIRCE.

Witnesses:
ABNER DILLON,
NATHAN DILLON.